United States Patent [19]
Reshke et al.

[11] Patent Number: 4,856,838
[45] Date of Patent: Aug. 15, 1989

[54] PROTECTIVE TRAILER

[76] Inventors: Robert A. Reshke, 8616 21st Ave. NW., Bradenton, Fla. 34209; Rocco T. Piergrossi, 5200 SW. 164th Ter., Ft. Lauderdale, Fla. 33331

[21] Appl. No.: 204,074

[22] Filed: Jun. 8, 1988

[51] Int. Cl.$^4$ .............................................. B60P 3/00
[52] U.S. Cl. ....................................... 296/14; 296/26; 296/181
[58] Field of Search ............... 296/26, 10, 14, 3, 181, 296/183; 280/765.1

[56] References Cited

U.S. PATENT DOCUMENTS

| | | | |
|---|---|---|---|
| 3,080,187 | 3/1963 | Lamb | 296/14 |
| 4,135,755 | 1/1979 | Steffens | 296/26 |
| 4,139,230 | 2/1979 | Barrentine et al. | 296/26 |

FOREIGN PATENT DOCUMENTS 1781170 9/1970 Fed. Rep. of Germany.

Primary Examiner—Robert R. Song
Attorney, Agent, or Firm—Charles J. Prescott

[57] ABSTRACT

A protective trailer for transporting, erecting and using a two-way satellite communication station. The invention includes a trailer bed operably supported by wheels for towing by a vehicle and also includes a screened enclosure having front, rear and side rigid-framed screen panels upwardly extending from the respective trailer bed margin. The side panels are hinge connected along their lower horizontal margins, outwardly pivoting to a diagonally disposed open position wherein the satellite dish may then be operated without physical interference. Triangular rigid-framed screen panels are connected to and inwardly disposed from each upright front and rear margin of each side panel to render the protective screened enclosure continuous when either or both side panels are opened as well as closed.

7 Claims, 2 Drawing Sheets

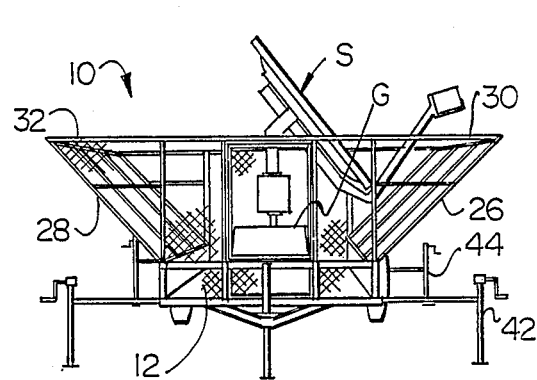
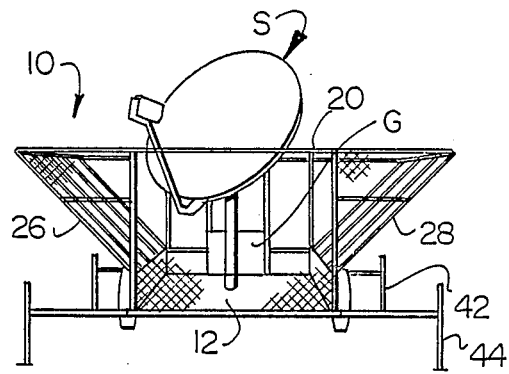
FIG. 5  FIG. 6
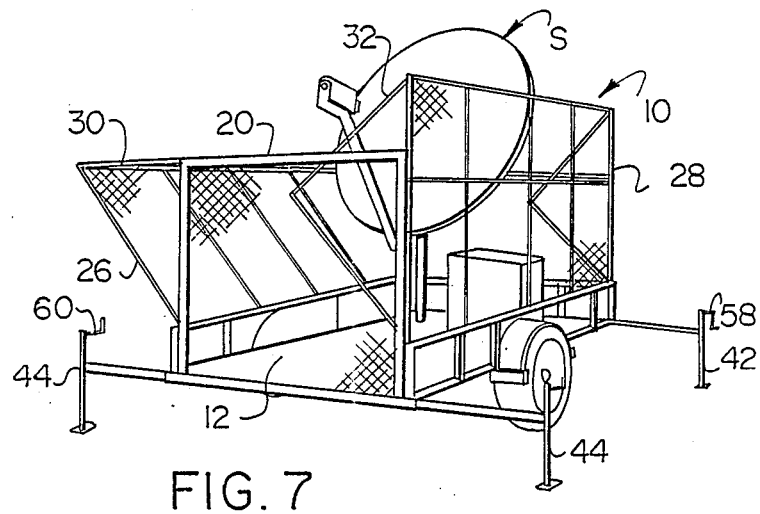
FIG. 7
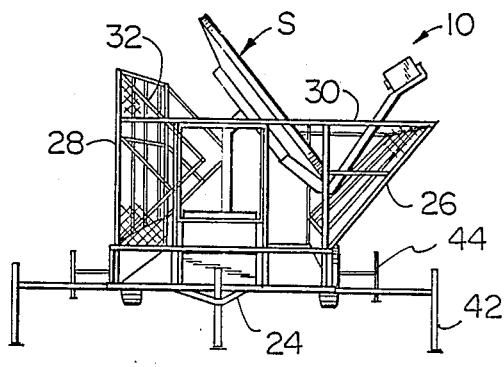
FIG 8

PROTECTIVE TRAILER

BACKGROUND OF THE INVENTION

This invention relates generally to portable satellite communication systems, and more particularly to a protective trailer for protected use of portable two-way satellite communications stations.

There is a present need for a protective mobile transportation system for portable satellite communications systems and their power sources which will facilitate the short lead time deployment of portable two-way satellite communications systems. Many times the satellite communications systems are required to replace a failed system or are required on short notice to effect an on-site two-way satellite communications requirement situation.

In addition to being quickly deployable and, therefore mobile, the system must also include surrounding protection so that bystanders the curious, and the malicious may not, without undue difficulty, interfere with the operation of the satellite communications system or its power source or damage same during operation. To applicant's knowledge, no such system is available to satisfy all of the above requirements.

The present invention provides a protective trailer for transporting, erecting and operation of a portable two-way satellite communications system which includes a screened enclosure which prevents intruders from tampering with or damaging the satellite system during both transporting and deployed operation of such systems.

BRIEF SUMMARY OF THE INVENTION

This invention is directed to a protective trailer for transporting, erecting and using a two-way satellite communication station. The invention includes a trailer bed operably supported by wheels for towing by a vehicle and also includes a screened enclosure having front, rear and side rigid-framed screen panels upwardly extending from the respective trailer bed margin. The side panels are hinge connected along their lower horizontal margin, outwardly pivoting to a diagonally disposed open position wherein the satellite dish may then be operated without physical interference. Triangular rigid-framed screen panels are connected to and inwardly disposed from each upright front and rear margin of each side panel to render the protective screened enclosure continuous when either or both side panels are opened as well as closed.

It is therfore an object of this invention to provide a protective trailer for transporting and deploying for operation a portable two-way satellite communications system.

It is another object of this invention to provide an adequate screened enclosure connected to a trailer bed which is adapted to support and transport two-way satellite communications systems and their power sources.

It is yet another object of this invention to provide screened enclosure protection for portable two-way satellite communications systems during both transporting and deployment of these systems.

In accordance with these and other objects which will become apparent hereinafter, the instant invention will now be described with reference to the accompanying drawings in which:

BRIEF DESCRIPTION OF THE DRAWINGS

FIG. 5 is a front perspective view of the invention in its deployed configuration.

FIG. 6 is a rear perspective view of the invention in its deployed configuration.

FIG. 7 is a right rear quarter perspective view of the invention in its partially closed position.

FIG. 8 is a front perspective view of the invention in its partially closed position.

DETAILED DESCRIPTION OF THE INVENTION

Figure 1:
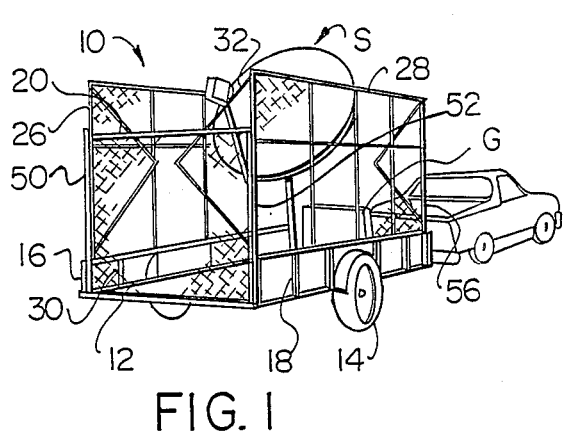
FIG. 1 is a rear perspective view of the invention in its closed position and connected to a vehicle ready for towing.
Figure 2:
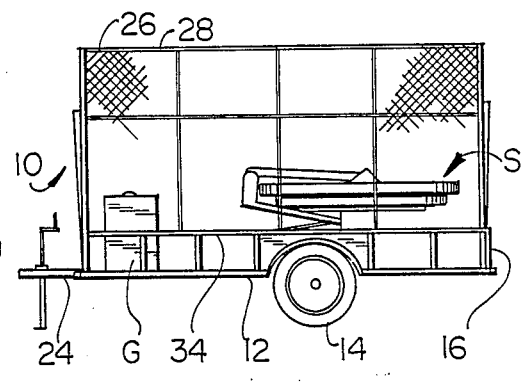
FIG. 2 is a left side elevation view of the invention in its closed position.
Figure 3:
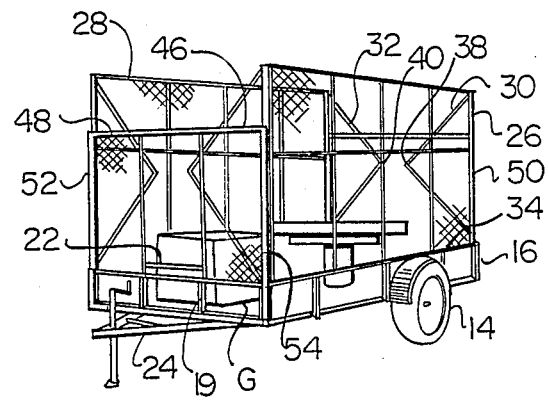
FIG. 3 is a left front quarter perspective view of the invention in its closed position.

Referring now to the drawings, and particularly to FIGS. 1, 2 and 3, the preferred embodiment of the invention is shown generally at numeral 10 and is shown in these various figures in its closed configuration. The invention 10 generally includes a flat bed trailer 12 operatively connected to and supported by wheels 14 and interconnecting axle. The trialer bed 12 also includes towing tongue 24 which, as seen in FIG. 1, is interconnectable to a typical bumper or frame trailer hitch attached to a vehicle ready for towing.

Rigidly connected and upwardly extending from the entire side and front margins of trailer bed 12 are short rigid framed screened panels 16, 18 and 19. The term "screened" is herein intended to preferrably refer to expanded sheet metal, but may also refer to any other form of fine or coarse mesh screen, chain link fence material, or the like.

Disposed pivotally along the rear margin of trailer bed 12 is gate 20 which is interconnected along either one of the upright margins 50 or 52 upwardly disposed from either rear corner of the trailer bed 12 or interconnected along the rear transverse horizontal margin of the trailer bed 12.

With respect to only trailering the two-way satellite communications system S in its down and stored configuration as best seen in FIGS. 2 and 3, and also for transporting generator G, the side configurations of the screened enclosure need only comprise generally upright connected panels. However, as will be herebelow described, when the satellite communications system S is deployed and is rendered operational, additional lateral clearance is required. To provide this clearance and also to continue to render the valuable contents within the invention 10 to be fully enclosed and protected by screened panels, side panels 26 and 28 are provided. These side panels 26 and 28 are fabricated from rigid frame members having expanded sheet metal disposed within that framing structure. These side panels 26 and 28 are hinge connected along their horizontal lower margins to panels 16 and 18. Use of conventional latch means retain these side panels 26 and 28 in their upright closed position as shown in these figures.

Also connected to side panels 26 and 28 are inwardly disposed, transversely oriented, triangular screened panels 30 and 32, one connected at both front and rear upright ends of each side panel 26 and 28, or two triangular panels 30 and 32 per side panel 26 and 28 respectively. In their closed orientation, the triangular panels 30 and 32 are inwardly disposed to overlap the previously described upright front and rear end panels in redundant fashion for storage.

Figure 4:
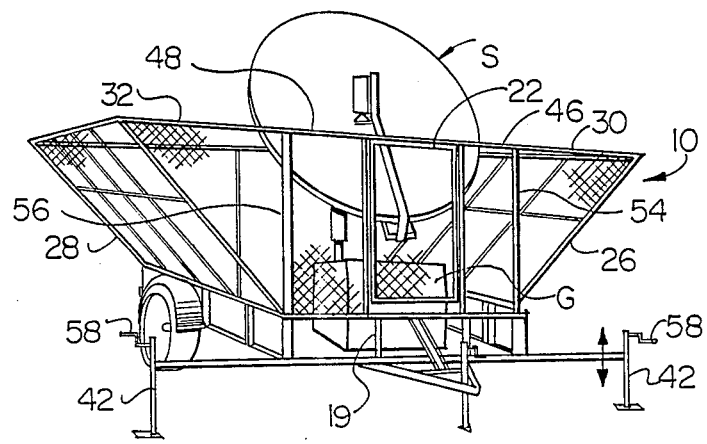
FIG. 4 is a right front quarter perspective view of the invention in its deployed or open configuration.

Referring now to FIGS. 4, 5 and 6, the invention 10 is there shown in its open, in-use configuration. The satellite communications system S is also shown in its in-use configuration, requiring additional lateral clearance to be fully operational. This clearance is provided by the invention 10 by simply outwardly pivoting side panels 26 and 28 to a locked position wherein they are generally diagonally outwardly and upwardly disposed as shown. The distal apexes 38 and 40 of triangular panels 30 and 32 include stop means which limit the outward pivotal motion of side panels 26 and 28 to that shown wherein the upward edge of triangular panels 30 and 32 are horizontally disposed and generally in alignment with the upper margins of the front and back screened panels as previously described.

By this arrangement, as may now be clearly understood, triangular panels 30 and 32 fill the otherwise opened area between the front and rear margins of side panels 26 and 28 and the corner upright supports 50, 52, 54 and 56 which, as previously described, are rigidly connected at the corners of the trailer bed 12 and upwardly disposed therefrom.

To position and secure the invention 10 in its in-use configuration, front outriggers 42 are provided which are laterally extendable and deployable downwardly by crank 58 from each corner of the trailer bed 12. As shown in FIG. 4, the two forward outriggers 42 are deployed and, as seen in the remainder of the FIGS. 5 to 8, both front and rear outriggers 42 and 44 are deployed to fully stablize the system 10 particularly against wind load.

As may be now more clearly seen in FIG. 4, the entire front panel area upwardly extending from the forward transverse margin of trailer bed 12 is fabricted of two spaced apart rigidly framed and fixed in place panels 46 and 48 and centrally located gate 22 which is provided to facilitate quick and easy access to service generator G during use. Ths gate 22 is hinge connected along one upright margin of either panel 46 or 48.

Referring lastly to FIGS. 7 and 8, the inventnion 10 is there shown with the right side panel 28 in its closed configuration, while the left side panel 26 remains in its open configuration. Again, the invention 10 is shown fully deployed having outriggers 42 and 44 operably disposed so as to fully support the entire system 10, including satellite communications system S and generator G. Crank handles 58 and 60 are utilized to elevate the entire trailer bed 12. In certain circumstances, likewise, only one side panel 26 or 28 need be deployed to effect sufficient clearance for the satellite system S to be fully operable.

Having fully described the invention, it should now be fully understood that the need which the present invention satisfies is to provide a full perimeter protective screen enclosure for the contents atop the trailer bed 12, namely a satellite communications system S and generator G. This screen enclosure is required both during transporting and during mobile deployment and operation of the satellite system S. While providing the necessary clearance for the fully operational satellite system S, the invention also continues to provide full continuous structural integrity of the surrounding screened enclosure so that the curious, as well as the malicious, are strongly inhibited by the structure of the present invention from gaining access to the contents atop the trailer bed. To that end, all of the various panels hereinabove described may be rendered lockable by conventional combination or padlocks so that the satellite system S may be safely left unattended during its fully operational mode.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A protective trailer for transporting, erecting and using a portable two-way satellite communications station comprising:
    a generally flat, rigid trailer bed supported above the ground by spaced apart wheels operably connected to the trailer bed for rotation;
    said trailer bed having a trailer tongue adapting said trailer bed to be towable by a vehicle;
    said trailer bed adapted to support a two-way satellite dish and its power source thereon;
    front and rear rigid framed end screen panels connected transversely to, and upwardly extending from, said trailer bed front and rear margins respectively;
    said front end panel including two spaced apart left and right panels and a hinged access gate swingable about a vertically oriented hinge axis, said access gate providing operator access to the satellite communications station;
    a rigid framed side screen panel pivotally connected along its lower margin to each longitudinally extending side margin of said trailer bed;
    each of said side panels having rigid framed triangular screen panels inwardly disposed from the front and rear upwardly extending margins respectively of each said side panel;
    each of said side panels having a closed position and an open position;
    each said side panel generally upright and cooperating with said front and rear end panels to render continuous screened protection around the entire perimeter of the trailer bed when in its closed position;
    each said front and rear triangular panel inwardly extending and overlapping said front and rear end panels respectively when each said side panel is in its closed position;
    each said side panel generally diagonally outwardly and upwardly extending from said respective trailer bed side margin when each said side panel is in its open position;
    each said front and rear triangular panels generally extending to cover the transverse area above said trailer front and rear margins respectively defined by the upright margins of said front and rear end panels respectively and said side panel front and rear end margins respectively to render continuous screen protection around the entire perimeter of said trailer bed when each said side panel is in its open position.

2. A protective trailer as set forth in claim 1, further comprising:

outrigger supports slidably connectable to each corner of said trailer bed and laterally extendable therefrom;

said outriggers also structured to be downwardly extendable and cooperating together to support said trailer bed above the ground.

3. A protective trailer as set forth in claim 2, wherein:

said rear end panel is openable for loading and unloading the satellite communications station onto and from said trailer bed.

4. A protective trailer as set forth in claim 3, further comprising:

an access gate disposed in said front end panel openable to provide operator access to the satellite communications station.

5. A protective screened enclosure connected to the horizontal margins of a trailer adapted for transporting, erecting and using a portable two-way satellite communications station comprising:

front and rear rigid framed end screen panels connected transversely to, and upwardly extending from, said trailer bed front and rear margins respectively;

said front end panel including two spaced apart left and right panels and a hinged access gate operably connected between said right and left panels to be openable to provide operator access to the satellite communications station;

a rigid framed side screen panel pivotally connected along its lower margin to each longitudinally extending side margin of said trailer bed;

each of said side panels having rigid framed triangular screen panels inwardly disposed froom the front and rear upwardly extending margins respectively of each said side panel;

each of said side panels having a closed position and an open position;

each said side panel generally upright and cooperating with said front and rear end panels to render continuous screened protection around the entire perimeter of the trailer bed when in its closed position;

each said front and rear triangular panel inwardly extending and overlapping said front and rear end panels respectively when each said side panel is in its closed position;

each said side panel generally diagonally outwardly and upwardly extending from said respective trailer bed side margin when each said side panel is in its open position;

each said front and rear triangular panels generally extending to cover the transverse area above said trailer front and rear margins respectively defined by the upright margins of said front and rear end panels respectively and said side panel front and rear end margins respectively to render continuous screen protection around the entire perimeter of said trailer bed when each said side panel is in its open position.

6. A protective screened enclosure as set forth in claim 5, wherein:

said enclosure is lockable in either its open or closed position.

7. A protective trailer for transporting, erecting and using a portable two-way satellite communications station comprising:

a generally flat, rigid trailer bed supported above the ground by spaced apart wheels operably connected to the trailer bed for rotation;

said trailer bed having a trailer tongue adapting said trailer bed to be towable by a vehicle;

said trailer bed adapted to support a two-way satellite dish and its power source thereon;

front and rear rigid framed end screen panels connected transversely to, and upwardly extending from, said trailer bed front and rear margin respectively;

said front end panel including an access gate operably connected to expose an opening in said front end panel, said access gate providing operator access to the satellite communications station;

a rigid framed side screen panel pivotally connected along its lower margin to each longitudinally extending side margin of said trailer bed;

each of said side panels having rigid framed triangular screen panels inwardly disposed from the front and rear upwardly extending margins respectively of each said side panel;

each of said side panels having a closed position and an open position;

each said side panel generally upright and cooperating with said front and rear end panels to render continuous screened protection around the entire perimeter of the trailer bed when in its closed position;

each said front and rear triangular panel inwardly extending and overlapping said front and rear end panels respectively when each said side panel is in its closed position;

each said side panel generally diagonally outwardly and upwardly extending from said respective trailer bed side margin when each said side panel is in its open position;

each said front and rear triangular panels generally extending to cover the transverse area above said trailer front and rear margins respectively defined by the upright margins of said front and rear end panels respectively and said side panel front and rear end margins respectively to render continuous screen protection around the entire perimeter of said trailer bed when each said side panel is in its open position.

* * * * *